US007191849B2

(12) United States Patent
Chen

(10) Patent No.: US 7,191,849 B2
(45) Date of Patent: Mar. 20, 2007

(54) PNEUMATIC TOOL

(75) Inventor: Ting-Yuan Chen, Taya Hsiang (TW)

(73) Assignee: Hyphone Machine Industry Co., Ltd., Shen Kang Hsiang (TW)

( * ) Notice: Subject to any disclaimer, the term of this patent is extended or adjusted under 35 U.S.C. 154(b) by 0 days.

(21) Appl. No.: 11/164,580

(22) Filed: Nov. 29, 2005

(65) Prior Publication Data

US 2006/0196685 A1 Sep. 7, 2006

Related U.S. Application Data

(62) Division of application No. 10/922,071, filed on Aug. 19, 2004, now Pat. No. 6,991,043.

(51) Int. Cl.
*B23B 45/04* (2006.01)
*B21J 1/00* (2006.01)

(52) U.S. Cl. ................ 173/169; 173/168; 173/DIG. 2; 181/230; 181/231; 181/258

(58) Field of Classification Search ................ 173/169, 173/168, 170, 171, 93.5, DIG. 2; 181/230, 181/212, 231, 258, 237, 224
See application file for complete search history.

(56) References Cited

U.S. PATENT DOCUMENTS 1,666,257 A 4/1928 Furnivall et al. ........... 181/258
1,903,803 A 4/1933 Barker ........................ 502/324
2,893,509 A 7/1959 Baird .......................... 181/212
2,995,200 A 8/1961 Seifert ........................ 181/213
3,880,245 A * 4/1975 Anderson, Jr. .............. 173/219
4,205,732 A 6/1980 Auerbach et al. ........... 181/230
4,258,798 A 3/1981 Campbell et al. ........... 173/168
4,712,643 A 12/1987 Iles et al. ................... 181/231
5,036,948 A 8/1991 Henn .......................... 181/258
5,847,334 A * 12/1998 Taga ........................... 181/230
5,866,860 A 2/1999 Chen ........................... 181/237
5,913,370 A * 6/1999 Chapelle et al. ............ 173/169
5,924,497 A * 7/1999 Spooner et al. ............. 173/169
6,062,323 A * 5/2000 Pusateri et al. ............. 173/169
6,343,672 B1 2/2002 Petela et al. ................ 181/224
6,668,971 B2 12/2003 Sterling ....................... 181/230

* cited by examiner

*Primary Examiner*—Scott A. Smith
(74) *Attorney, Agent, or Firm*—Alan D. Kamrath; Nikolai & Mersereau, P.A.

(57) ABSTRACT

A pneumatic tool includes a shell with a chamber defined therein, a first passage communicated with the chamber and a second passage communicated with the chamber. A rotor is installed in the chamber for rotation when driven by pressurized air flowing into the chamber through the first passage. A shaft extends to the exterior of the shell from the rotor. A trigger is installed on the shell. A control device is put in the first passage and connected with the trigger for controlling the first passage. A muffler is put in the second passage. The muffler includes a plurality of balls.

8 Claims, 7 Drawing Sheets

PNEUMATIC TOOL

CROSS REFERENCE

The present application is a division of U.S. application Ser. No. 10/922,071 filed on Aug. 19, 2004, now U.S. Pat. No. 6,991,043.

BACKGROUND OF INVENTION

1. Field of Invention

The present invention relates to a pneumatic tool.

2. Related Prior Art

Referring to FIG. 7, a typical pneumatic tool 90 includes a shell 91 defining a working space, a first passage 92 and a second passage 93. Although not shown, a core is put in the working space of the shell 91. Pressurized air flows into the working space from a pump (not shown) through the first passage 92. The pressurized air flows to the exterior of the shell 91 from the working space through the second passage 93. The core is rotated by the pressurized air in the working space. A muffler 94 is fit in the second passage 93. The muffler 94 defines a plurality of gaps (not numbered) through which the pressurized air flows. The gaps defined in the muffler 94 are very small. Thus, the pressurized air is not completely exhausted through the muffler 94. Some of the pressurized air is retained in the shell 91 so that it often causes wrong actions and even causes accidents.

The present invention is therefore intended to obviate or at least alleviate the problems encountered in the prior art.

SUMMARY OF INVENTION

According to the present invention, a pneumatic tool includes a shell with a chamber defined therein, a first passage communicated with the chamber and a second passage communicated with the chamber. A rotor is installed in the chamber for rotation when driven by pressurized air flowing into the chamber through the first passage. A shaft extends to the exterior of the shell from the rotor. A trigger is installed on the shell. A control device is put in the first passage and connected with the trigger for controlling the first passage. A muffler is put in the second passage. The muffler includes a plurality of balls.

The primary advantage of the pneumatic tool of the present invention is that it smoothly exhausts the pressurized air and efficiently reduces the noises that the pressurized air makes.

Other objectives, advantages, and novel features of the invention will become more apparent from the following detailed description when taken in conjunction with the drawings.

BRIEF DESCRIPTION OF DRAWINGS

The present invention will be described through detailed illustration of embodiments referring to the drawings.

DETAILED DESCRIPTION OF EMBODIMENTS

Figure 1:
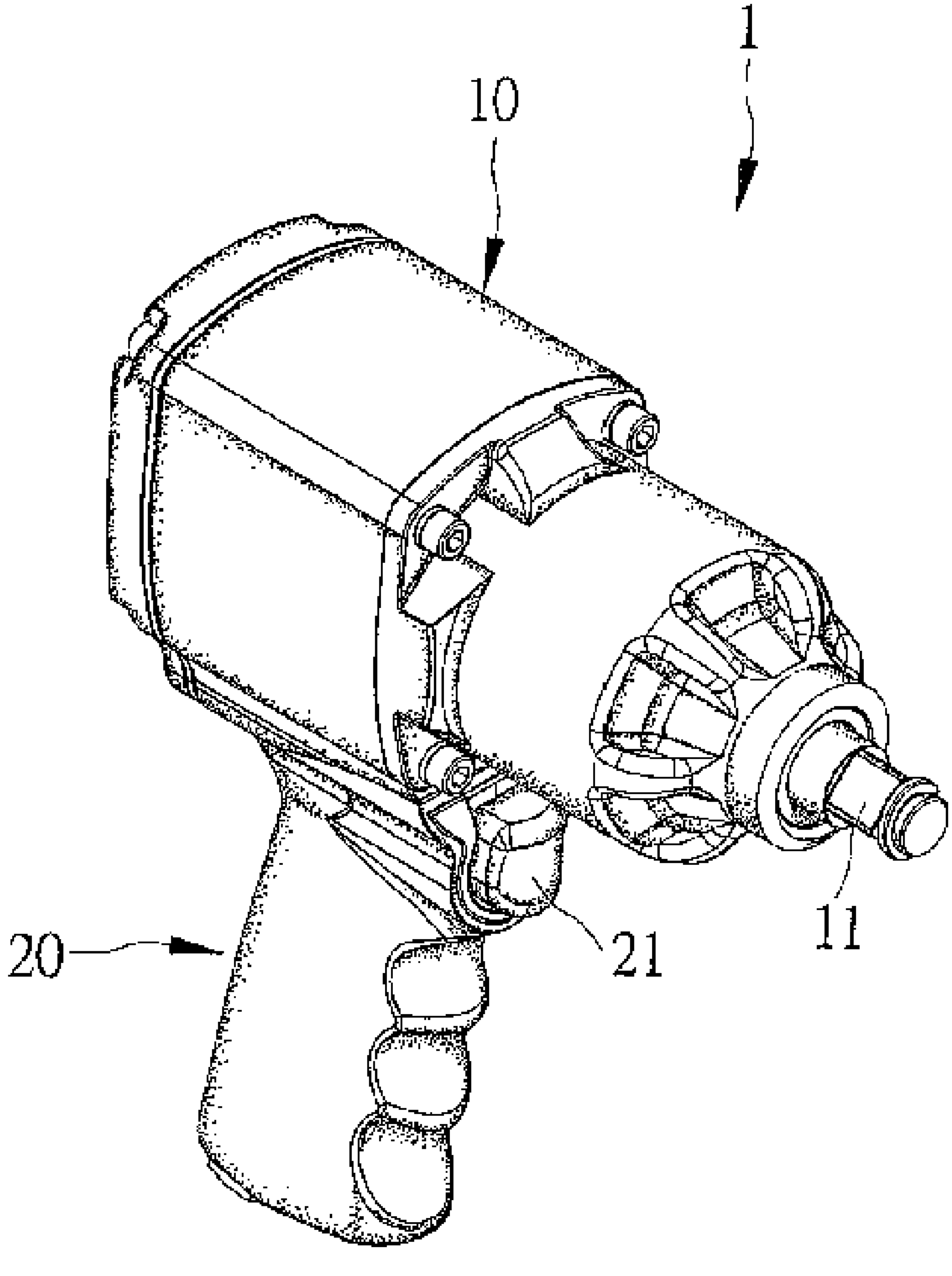
FIG. 1 is a perspective view of a pneumatic tool according to a first embodiment of the present invention.

FIG. 1 shows a pneumatic tool 1 according to a first embodiment of the present invention. The pneumatic tool 1 includes a shell consisting of a barrel 10 and a handle 20 extending from the barrel 10.

Figure 2:
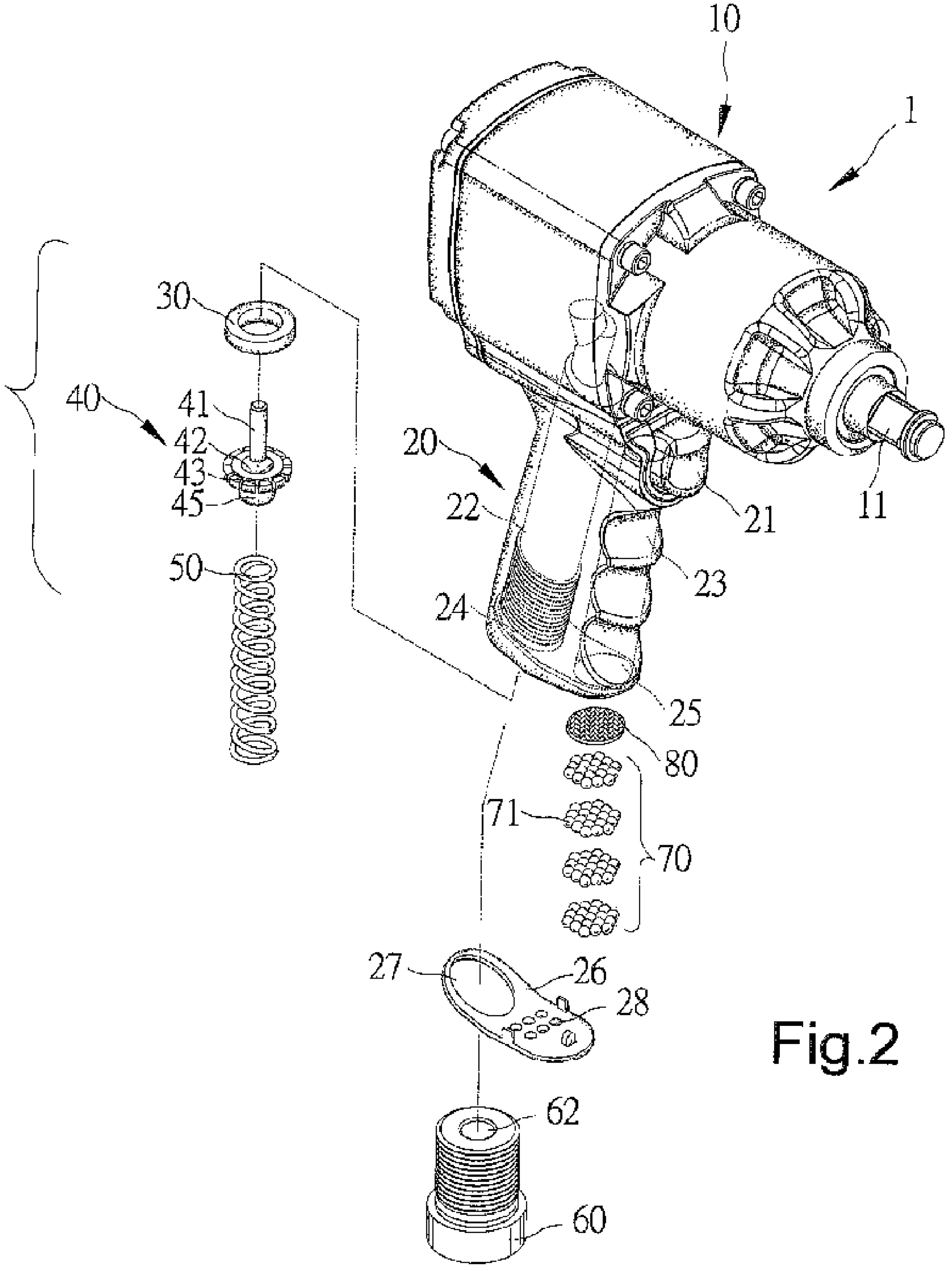
FIG. 2 is an exploded view of the pneumatic tool of FIG. 1.
Figure 3:
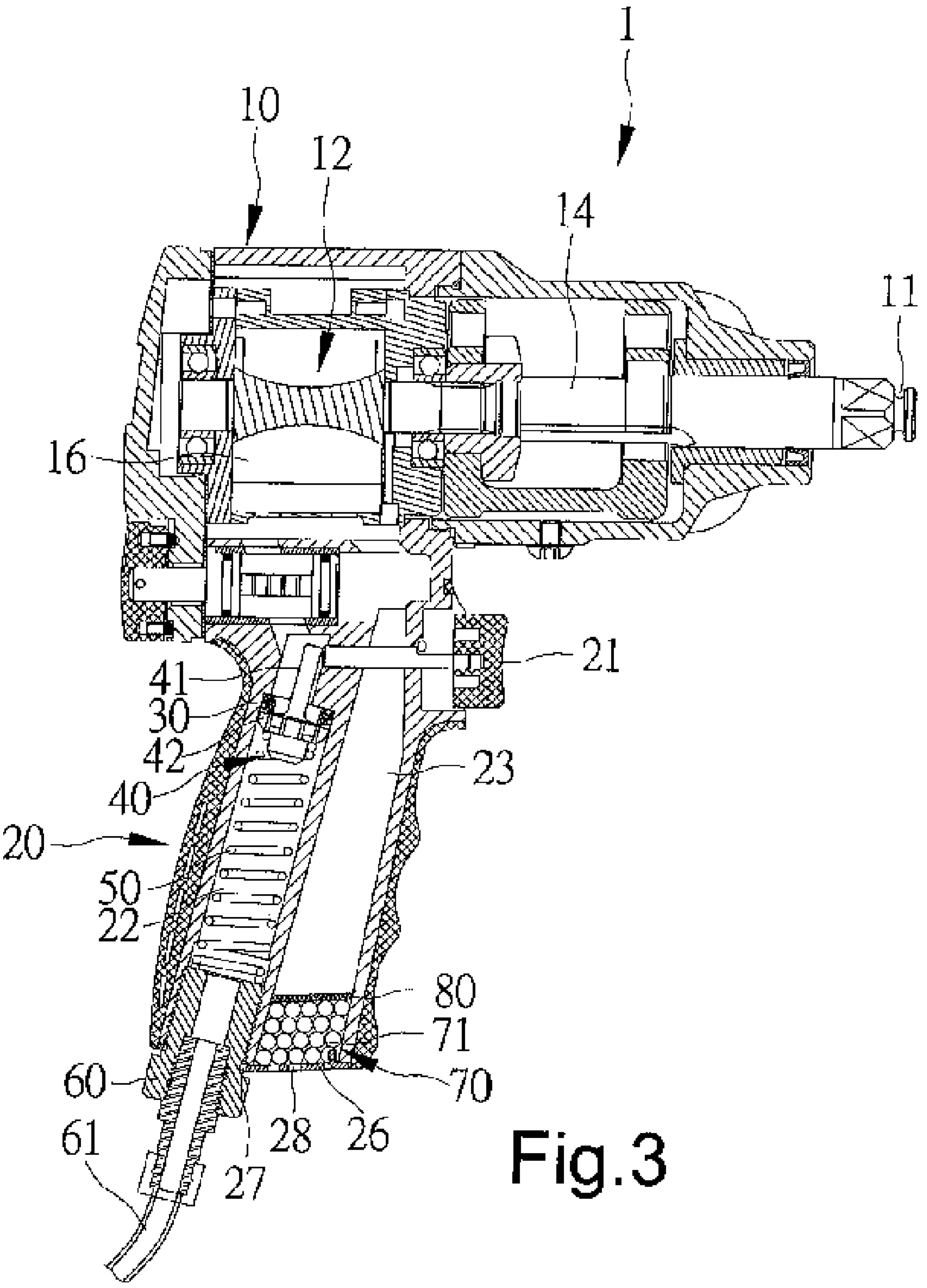
FIG. 3 is a cross-sectional view of the pneumatic tool of FIG. 1.

Referring to FIGS. 2 and 3, the pneumatic tool 1 includes a rotor 12 installed in a chamber 16 defined in the barrel 10. A shaft 14 is connected with the rotor 12 in a co-axial manner. The shaft 14 includes a driving tip 11 exposed to the exterior of the barrel 10. A socket (not shown) can be engaged with the driving tip 11.

The handle 20 includes a first passage 22 communicated with the chamber 16 and a second passage 23 communicated with the chamber 16. The first passage 22 includes an entrance 24. The second passage 23 includes an exit 25.

A control device is put in the first passage 22. The control device includes a washer 30, a valve 40 and a spring 50. The valve 40 includes a disc 42, a rod 41 extending from the disc 42 in a direction and a tongue 45 extending from the disc 42 in an opposite direction. Several gaps 43 are defined in the disc 42. The washer 30 is put on the disc 42. The tongue 45 extends into the spring 50.

A trigger 21 is put on the handle 20. The trigger 21 extends into the first passage 22 through the second passage 23 in order to abut the rod 41.

A muffler 70 is put in the second passage 23. The muffler 70 consists of a plurality of balls 71. The balls 71 may be provided in various layers.

A cover 26 includes an aperture 27 defined therein and a plurality of vents 28 defined therein. The cover 26 is attached to the handle 20 so that the aperture 27 is aligned with the entrance 24 and that the vents 28 are aligned with the exit 25.

A screw 60 includes an aperture 62 defined therein. The screw 60 is driven into the first passage 22 through the aperture 27 in order to secure the cover 26 to the handle 20 of the shell. The screw 60 abuts the spring 50. The aperture 62 is aligned with the aperture 27 and the entrance 24. A pipe 61 can be inserted into the first passage 22 through the aperture 62 and the aperture 27.

A restraint 80 is put in the second passage 23. The balls 71 are restrained between the restraint 80 and the cover 26.

Figure 4:
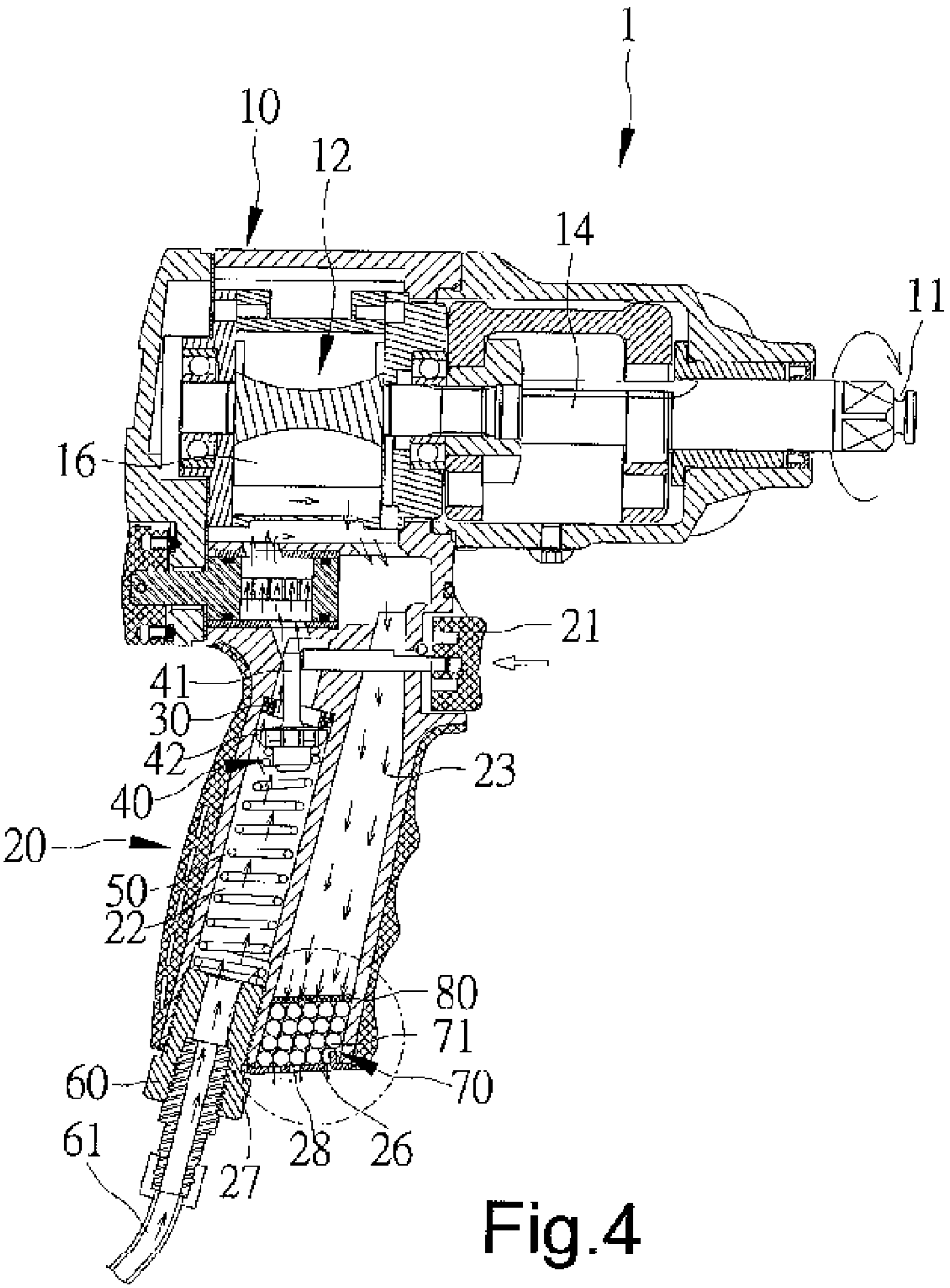
FIG. 4 is similar to FIG. 3 but shows the pneumatic tool working.
Figure 5:
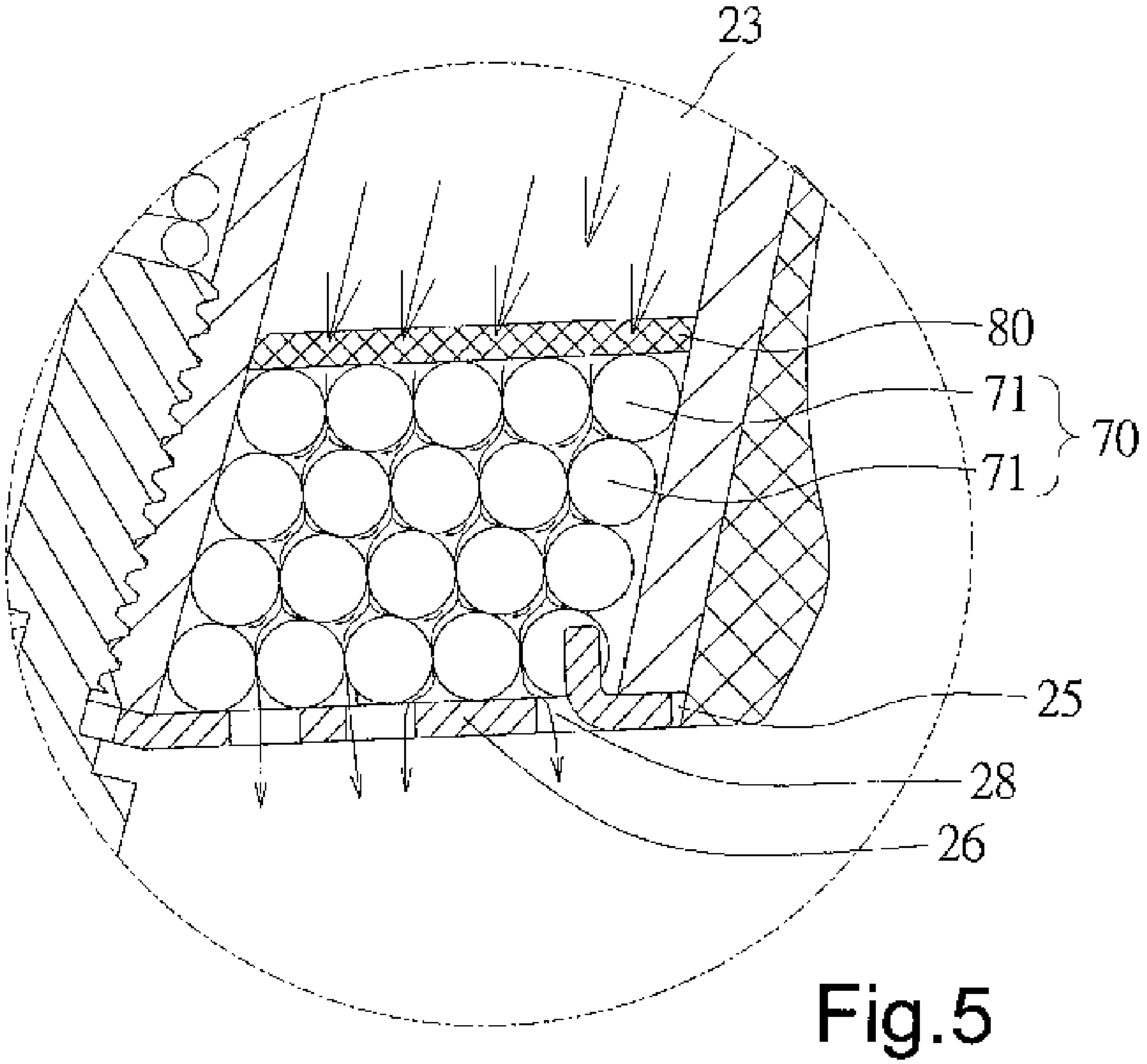
FIG. 5 is an enlarged cross-sectional partial view of a muffler used in the pneumatic tool of FIG. 4.

Referring to FIGS. 4 and 5, the trigger 21 is pulled in order to bring the pneumatic tool 1 to a working mode. The trigger 21 pushes the rod 41. The movement of the rod 41 causes a gap between the washer 30 and the valve 40. Thus, pressurized air flows to the chamber 16 from a pump (not shown) through the first passage 22. While flowing in the chamber 16, the pressurized air rotates the rotor 12 which in turn drives the shaft 14. Then, the pressurized air flows to the exterior of the shell from the chamber 16 through the second passage 23. While flowing in the second passage 23, the pressurized air is blocked by the balls 71 so that the speed thereof is reduced. The pressurized air is detoured around the balls 71 so that it makes a small noise when exhausting from the second passage 23.

Figure 6:
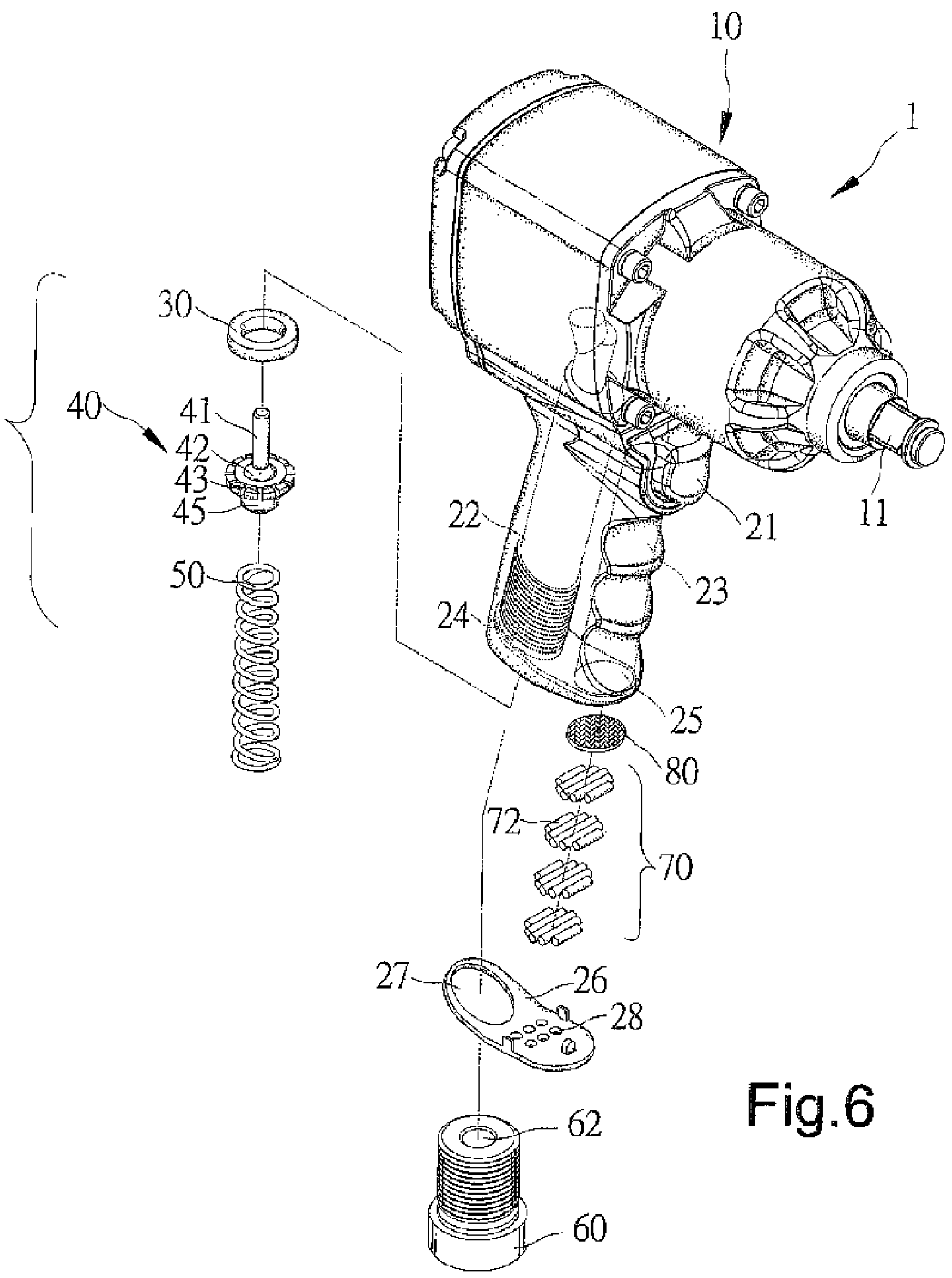
FIG. 6 is an exploded view of a pneumatic tool according to a second embodiment of the present invention.
Figure 7:
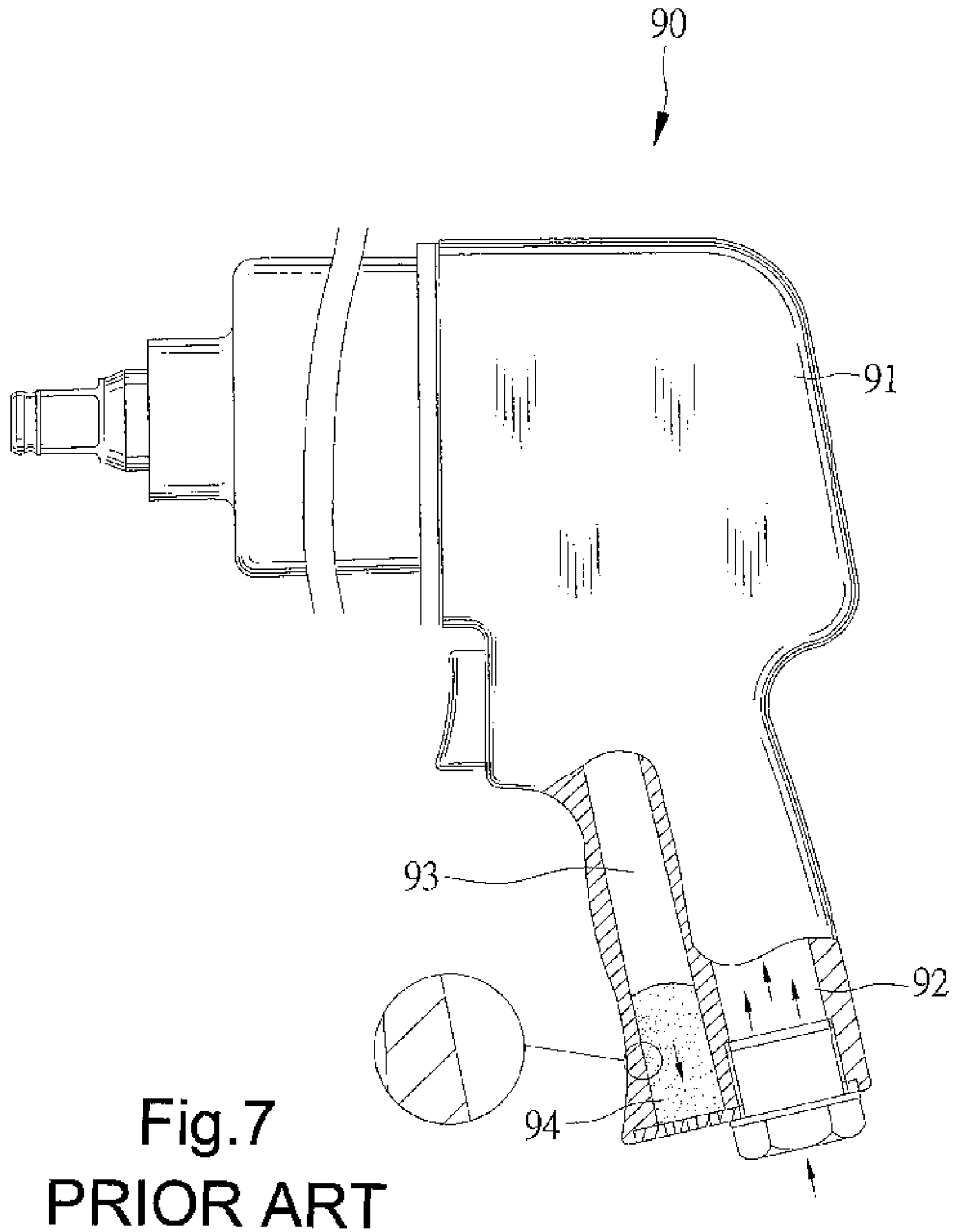
Fig.7 PRIOR ART
FIG. 7 is a cross-sectional partial view of a conventional pneumatic tool.

FIG. 6 shows a pneumatic tool according to a second embodiment of the present invention. The second embodiment is identical to the first embodiment except for including rods 72 instead of the balls 71.

The pneumatic tool according to the first or second embodiment of the present invention smoothly exhausts the pressurized air and efficiently reduces the noises that the pressurized air makes.

The present invention has been described through detailed illustration of the embodiments. Those skilled in the art can derive variations from the embodiments. The embodiments hence shall not limit the scope of the present invention defined in the claims.

What is claimed is:

1. A pneumatic tool comprising:

a shell comprising a chamber defined therein, a first passage communicated with the chamber and a second passage communicated with the chamber, with the second passage including an exit;

a rotor installed in the chamber for rotation when driven by pressurized air flowing into the chamber through the first passage;

a shaft extending to the exterior of the shell from the rotor;

a trigger installed on the shell;

a control device in the first passage and connected with the trigger for controlling the first passage;

a muffler in the second passage;

a cover extending over the exit of the second passage; and a restraint in the second passage so that the muffler is restrained between the restraint and the cover, with the second passage between the restraint and the exit being of constant cross-sectional size, with the muffler comprising a plurality of layers between the cover and the restraint, with each of the plurality of layers between the cover and the restraint consisting of an equal number of a plurality of balls.

2. The pneumatic tool according to claim 1 wherein the shell comprises a barrel and a handle extending from the barrel.

3. The pneumatic tool according to claim 2 wherein the chamber is defined in the barrel.

4. The pneumatic tool according to claim 2 wherein the first and second passages are defined in the handle.

5. The pneumatic tool according to claim 1 with the first passage including an entrance, with the cover extending over the entrance of the first passage.

6. The pneumatic tool according to claim 5 wherein the cover includes at least one vent conummicated with the second passage for exhausting the pressurized air.

7. The pneumatic tool according to claim 5 further comprising a screw driven into the first passage through an aperture defined in the cover in order to secure the cover to the shell, with the screw having an axial aperture for communication with the first passage.

8. The pneumatic tool according to claim 7 with the control device comprising: a disc having a first face and a second face; a rod extending from the first face of the disc; a washer positioned around the rod; and a spring sandwiched between the screw and the second face of the disc, with a shoulder defined in the first passage, with the washer being sandwiched between the first face of the disc and shoulder, with the trigger abutting the rod to selectively push the rod to create a gap between the washer and the disc.

* * * * *